US011958159B2

(12) United States Patent
Petsri et al.

(10) Patent No.: US 11,958,159 B2
(45) Date of Patent: Apr. 16, 2024

(54) BELT SANDER

(71) Applicant: MAKITA CORPORATION, Anjo (JP)

(72) Inventors: Pisan Petsri, Chonburi (TH); Wilawan Ardwichian, Chonburi (TH)

(73) Assignee: MAKITA CORPORATION, Anjo (JP)

( * ) Notice: Subject to any disclaimer, the term of this patent is extended or adjusted under 35 U.S.C. 154(b) by 718 days.

(21) Appl. No.: 16/973,120

(22) PCT Filed: Jun. 12, 2019

(86) PCT No.: PCT/JP2019/023350

§ 371 (c)(1),
(2) Date: Dec. 8, 2020

(87) PCT Pub. No.: WO2020/004044

PCT Pub. Date: Jan. 2, 2020

(65) Prior Publication Data

US 2021/0252665 A1 Aug. 19, 2021

(30) Foreign Application Priority Data

Jun. 28, 2018 (JP) ................................ 2018-123485

(51) Int. Cl.
*B24B 23/06* (2006.01)
*B25F 5/02* (2006.01)

(52) U.S. Cl.
CPC ................ *B24B 23/06* (2013.01); *B25F 5/02* (2013.01)

(58) Field of Classification Search
CPC ....... B24B 23/06; B24B 21/00; B24B 21/004; B24B 27/0007; B25F 5/02; B25F 5/00;
(Continued)

(56) References Cited

U.S. PATENT DOCUMENTS

2006/0128287 A1* 6/2006 Coe ......................... B24B 21/00 451/361
2008/0277554 A1* 11/2008 Bagby ..................... B24B 23/06 248/346.07
2008/0294962 A1 11/2008 Goel
(Continued)

FOREIGN PATENT DOCUMENTS

DE 3823392 A1 * 7/1988
JP S45-21184 Y1 8/1970
(Continued)

OTHER PUBLICATIONS

DE-3823392-A1 Espacenet translation (Year: 2023).*
(Continued)

*Primary Examiner* — Brian D Keller
*Assistant Examiner* — Tim Brady
(74) *Attorney, Agent, or Firm* — Oliff PLC

(57) ABSTRACT

A belt sander includes a grip portion, an electric motor, a first operating unit, and a second operating unit. The grip portion is configured to be gripped by an operator. The electric motor is configured to drive a sanding belt. The first operating unit is configured to perform an on-operation of the electric motor and configured to keep the on-operation. The second operating unit is configured to perform an on-operation of the electric motor. The electric motor is rotated by the on-operations of both the first operating unit and the second operating unit. The second operating unit is disposed at a position where an operation is allowed by a hand that grips the grip portion.

7 Claims, 7 Drawing Sheets

(58) Field of Classification Search

CPC .... B25F 1/00; B25F 3/00; B25F 5/001; B25F 5/024; B25F 5/026; H01H 2231/048; B25B 21/00; B25B 23/14; B25D 11/00; B25D 16/006; B25D 17/00; B25D 2250/255; B25D 2250/261; B25D 2250/275

USPC .... 451/355, 59, 296, 299; 200/43.11, 43.13, 200/43.16–43.18, 505, 522, 332.2; 335/159, 160, 166–167

See application file for complete search history.

(56) References Cited

U.S. PATENT DOCUMENTS

| | | | | |
|---|---|---|---|---|
| 2010/0236800 | A1* | 9/2010 | Watanabe | B25D 17/043 173/162.2 |
| 2012/0317821 | A1 | 12/2012 | Tsuchiya et al. | |
| 2015/0113815 | A1* | 4/2015 | McRoberts | B23D 51/01 30/392 |
| 2015/0258658 | A1* | 9/2015 | Steingruber | F16D 49/10 188/77 W |
| 2018/0200917 | A1 | 7/2018 | Kachi et al. | |
| 2019/0176316 | A1 | 6/2019 | Numata | |
| 2020/0139529 | A1* | 5/2020 | Habermann | H02K 11/28 |

FOREIGN PATENT DOCUMENTS

| | | | |
|---|---|---|---|
| JP | 2006-116624 | A | 5/2006 |
| JP | 2008-126348 | A | 6/2008 |
| JP | 2010-221328 | A | 10/2010 |
| JP | 2011-172521 | A | 9/2011 |
| JP | 2014-148018 | A | 8/2014 |
| JP | 2017-19224 | A | 1/2017 |
| JP | 2017-164858 | A | 9/2017 |
| KR | 10-2015-0049507 | A | 5/2015 |
| WO | 2014/119127 | A1 | 8/2014 |
| WO | 2015/169350 | A1 | 11/2015 |

OTHER PUBLICATIONS

Aug. 27, 2019 International Search Report issued in International Patent Application No. PCT/JP2019/023350.

Aug. 27, 2019 Written Opinion issued in International Patent Application No. PCT/JP2019/023350.

Jul. 4, 2022 Office Action issued in Chinese Patent Application No. 201980043737.2.

Nov. 11, 2021 Office Action issued in Japanese Patent Application No. 2018-123485.

* cited by examiner

BELT SANDER

This application claims the benefits of International Application No. PCT/JP2019/023350, filed on Jun. 12, 2019 and Japanese Patent Application Number No. 2018-123485 filed on Jun. 28, 2018, the entirety of which is incorporated by reference.

BACKGROUND OF THE INVENTION

Technical Field

The present invention relates to a belt sander that includes an endless sanding belt in a lower portion of a housing.

Background Art

As disclosed in Japanese Laid-Open Patent Publication No. 2014-148018, a known belt sander includes a trigger-shaped switch operating unit in a lower portion of a handle. The switch operating unit commands a start and a stop of a motor that drives a sanding belt.

When the belt sander is used, in some cases, the belt sander is placed on a flat surface in a reversed state where a sanding belt faces an upper side. Therefore, a lock-on mechanism is disposed to continue a starting command of a motor without continuing an operation of a switch operating unit.

SUMMARY OF THE INVENTION

For the belt sander with the lock-on mechanism, when an operator releases his/her hand from the belt sander while the sanding belt faces downward in a state where the lock-on mechanism operates, the belt sander possibly unintentionally moves due to the motion of the sanding belt.

Therefore, a main object of the present invention is to provide a belt sander in which an operation of a lock-on mechanism is facilitated.

In addition, another main object of the present invention is to provide the belt sander in which an unintentional movement during the operation of the lock-on mechanism is avoided.

To achieve the above-described object, a first aspect of the invention is a belt sander that includes a grip portion, an electric motor, a first operating unit, and a second operating unit. The grip portion is configured to be gripped by an operator. The electric motor is configured to drive a sanding belt. The first operating unit is configured to perform an on-operation of the electric motor and configured to keep the on-operation. The second operating unit is configured to perform an on-operation of the electric motor. The electric motor is rotated by the on-operations of both the first operating unit and the second operating unit. The second operating unit is disposed at a position where an operation is allowed by a hand that grips the grip portion.

In a second aspect of the invention, in the above-described invention, an off-operation of the second operating unit may be performed by releasing the hand from the grip portion.

In a third aspect of the invention, in the above-described invention, the second operating unit may be disposed on a surface on the operator side of the grip portion, the on-operation of the second operating unit may be a press operation, and the off-operation of the second operating unit may be a release of the press operation.

A fourth aspect of the invention, in the above-described invention includes a main body that includes the grip portion. The surface on the operator side of the grip portion may includes an uppermost surface of the main body, and in a reversed state in which the uppermost surface contacts a flat surface, the second operating unit may be pressed by the flat surface.

In a fifth aspect of the invention, in the above-described invention, the second operating unit may have a dorsal fin shape.

In a sixth aspect of the invention, in the above-described invention, the first operating unit may be disposed on a surface on an opposite side of the surface on the operator side of the grip portion, the on-operation of the first operating unit may be a pull operation, a keeping of the on-operation of the first operating unit may be performed by a lock operation unit configured to switch the keeping and a release of the pull operation state, and an off-operation of the first operating unit may be the release of the pull operation.

In a seventh aspect of the invention, in the above-described invention, a spring may be interposed between the first operating unit and the second operating unit, and the spring may bias both the first operating unit and the second operating unit in a direction of the off-operation state.

In an eighth aspect of the invention, in the above-described invention, the spring may be a torsion spring.

A main effect of the present invention is to provide the belt sander in which the operation of the lock-on mechanism is facilitated.

In addition, another main effect of the present invention is to provide the belt sander in which the unintentional movement during the operation of the lock-on mechanism is avoided.

BRIEF DESCRIPTION OF THE DRAWINGS

FIG. 4A is an enlarged view of a center portion of FIG. 3 when a switch lever is pressed in.

FIG. 4B is an enlarged view of the center portion of FIG. 3 when the switch lever and a lock-off lever are pressed in.

FIG. 6A is a center vertical cross-sectional view of the center portion of FIG. 3 when the switch lever and the lock-off lever are pressed in.

FIG. 6B is a cross-sectional view taken along II-II of FIG. 6A.

FIG. 7 is a center vertical cross-sectional view of the center portion of FIG. 3 when the lock-off lever is further pressed in.

EMBODIMENTS

The following describes an embodiment and its modification example of the present invention based on the drawings as necessary.

Front and rear, up and down, and left and right in the embodiment and the modification example are defined for convenience of explanation, and changed depending on at least one of a condition of an operation and a state of a moving member, and the like in some cases.

Figure 1:
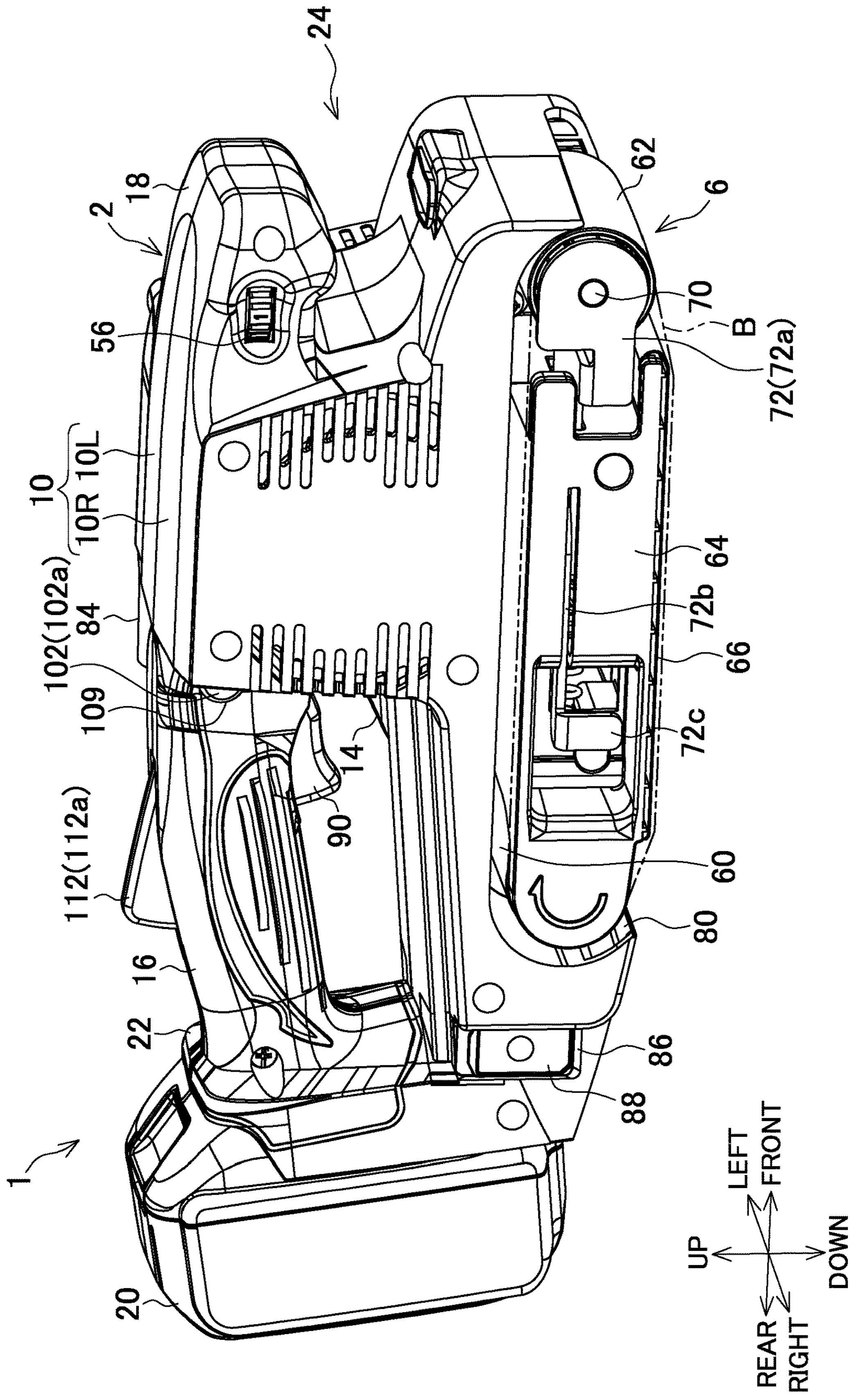
FIG. 1 is a perspective view of a sander according to the present invention.
Figure 2:
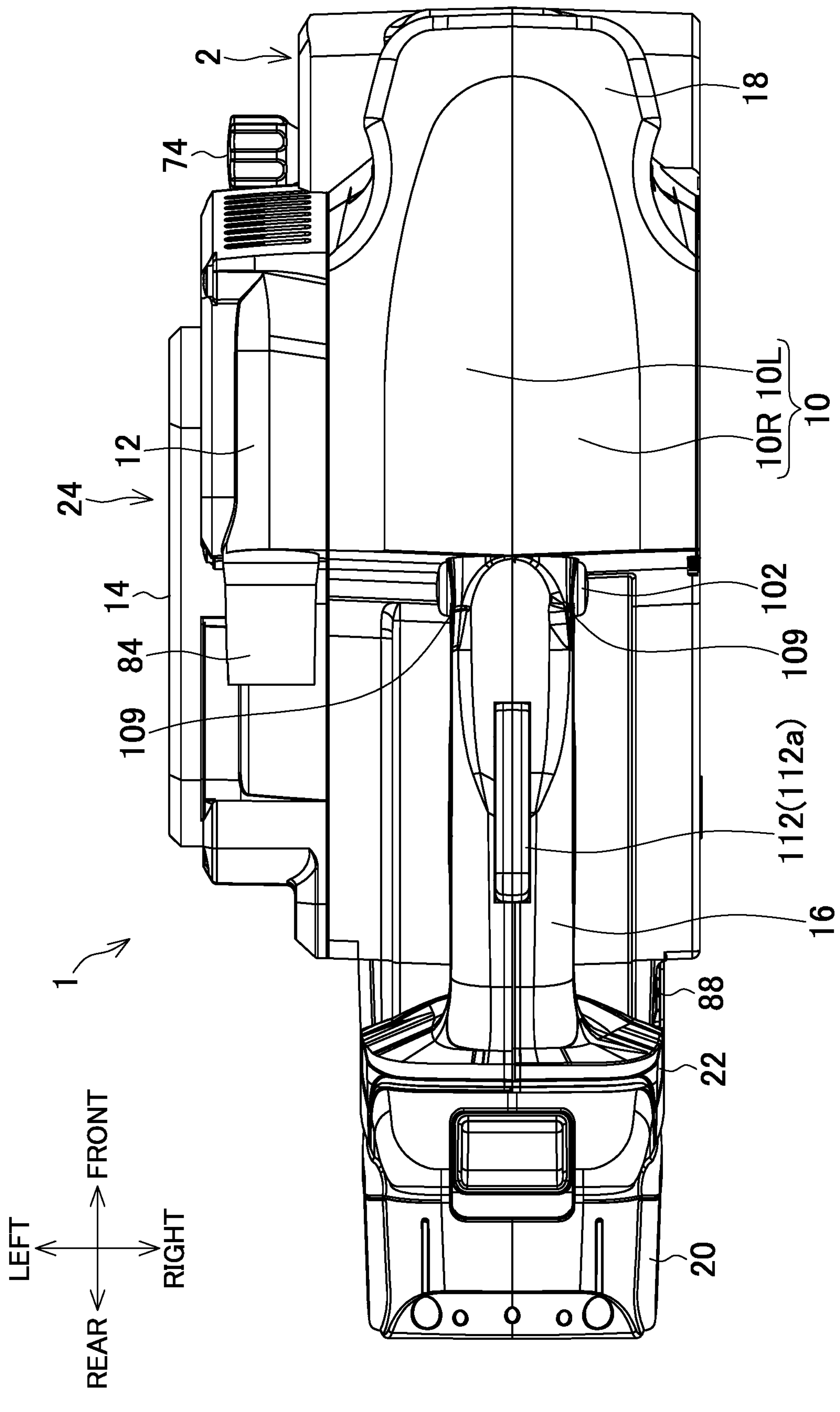
FIG. 2 is a top view of FIG. 1.
Figure 3:
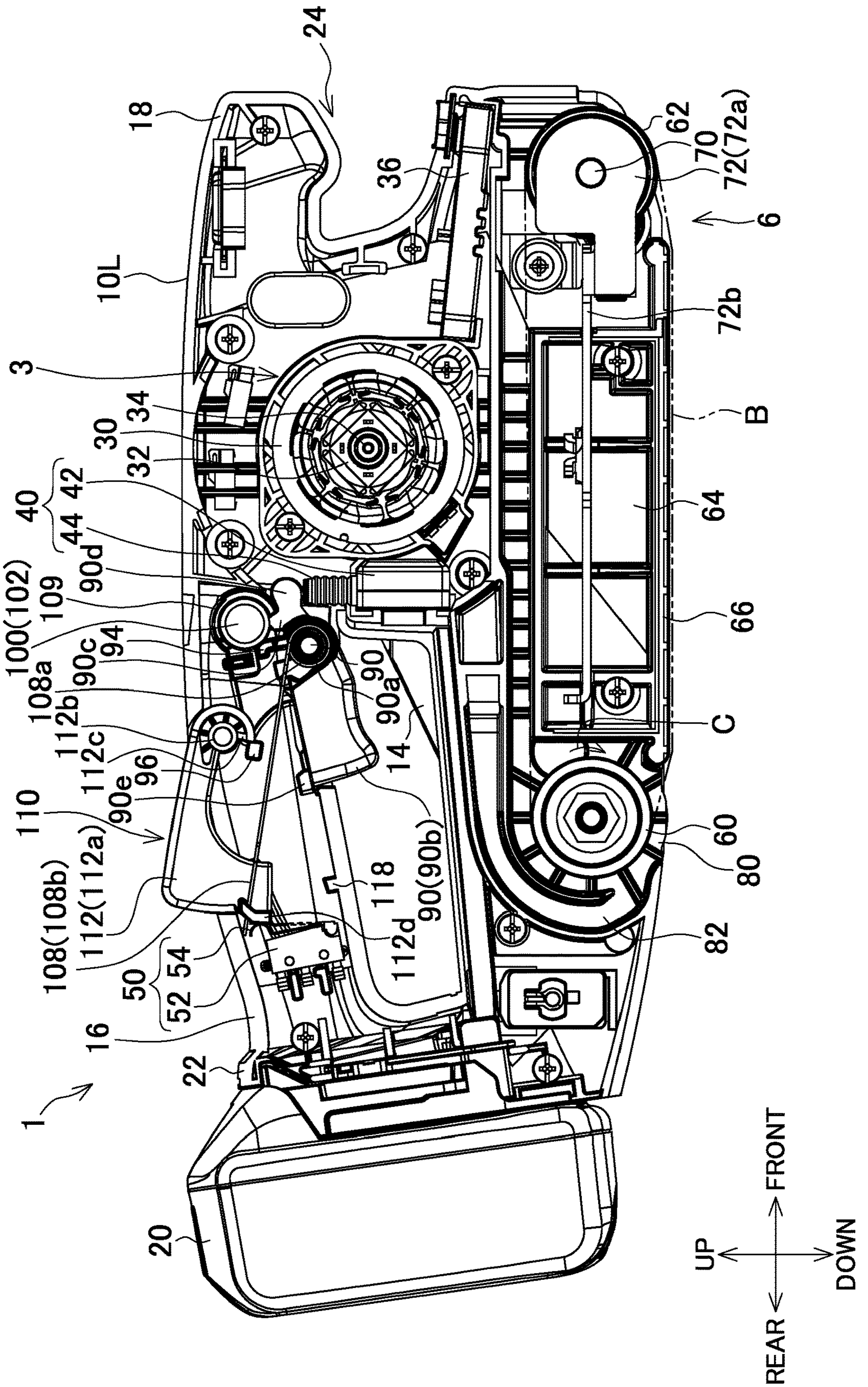
FIG. 3 is a right side view with cover removed of FIG. 1.
Figure 4A:
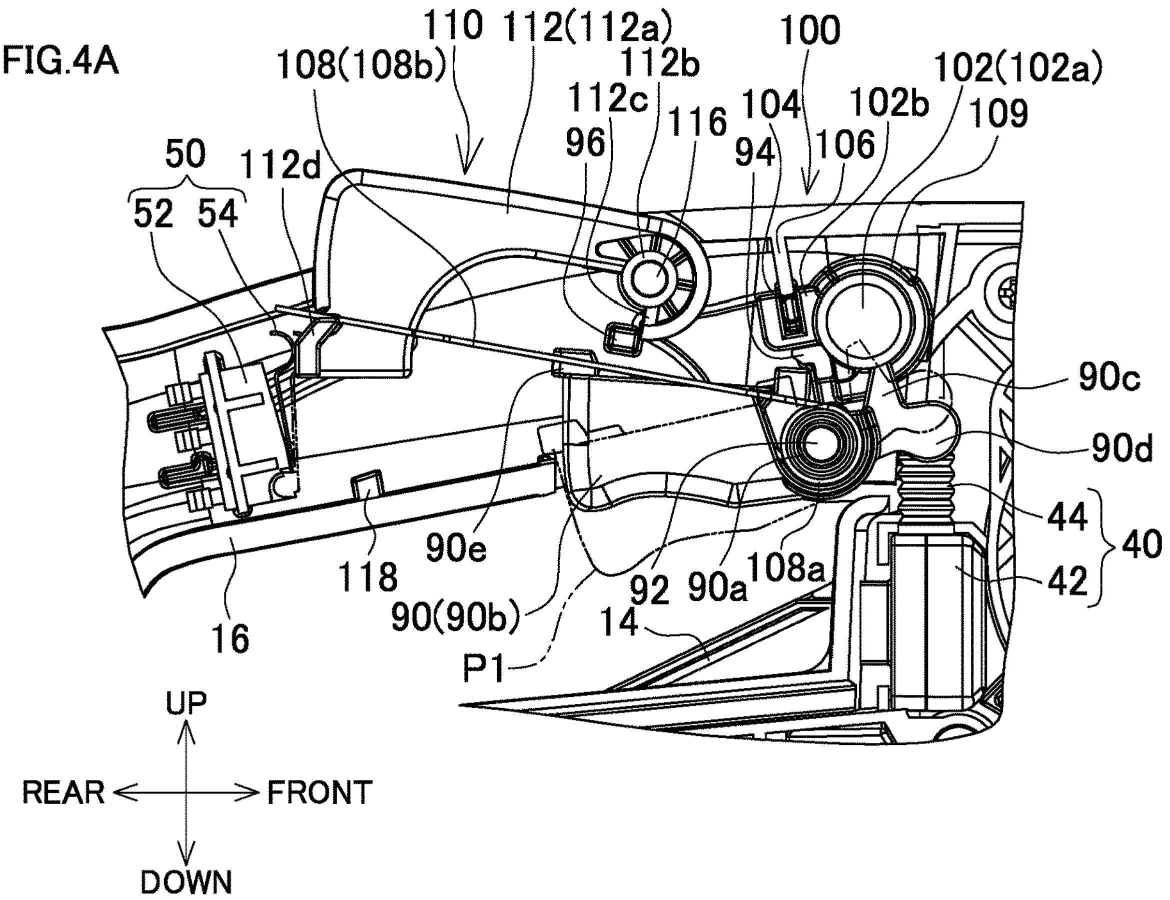
Figure 4B:
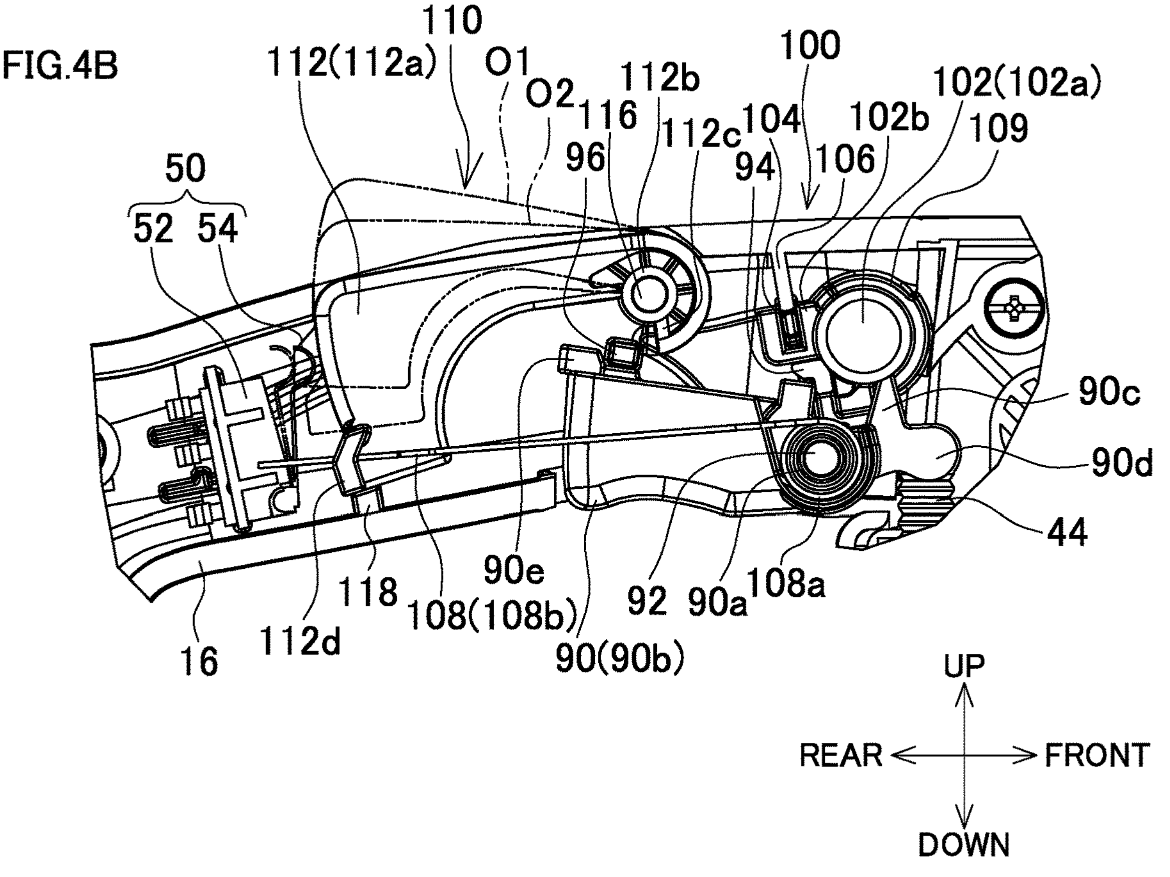

FIG. 1 is a perspective view of a belt sander 1 according to the embodiment. FIG. 2 is a top view of the belt sander 1 (right side of the drawing is a front side of the belt sander 1, and upper side of the drawing is a left side of the belt sander 1). FIG. 3 is a right side view with cover removed (a right main body housing 10R removed) of the belt sander 1 (right side of the drawing is the front side of the belt sander 1, and upper side of the drawing is an upper side of the belt sander 1).

The belt sander 1 includes a housing 2, a brushless motor 3, a power transmission unit (not illustrated) that transmits its power, and a belt drive unit 6 that drives a sanding belt B.

The housing 2 includes a main body housing 10, a lateral housing 12, and a side cover 14.

The main body housing 10 holds the brushless motor 3 as an electric motor in the center of an upper portion, and holds the belt drive unit 6 in a lower portion in a state where a part of its lower end portion is exposed. An upper rear portion of the main body housing 10 positioned at the rear of the brushless motor 3 constitutes an outer wall of a grip 16 (grip portion) that extends in a front-rear direction while having an interval with the belt drive unit 6. An upper front portion of the main body housing 10 positioned at the front of the brushless motor 3 constitutes an outer wall of a front grip 18 that extends in the front-rear direction while having an interval with the belt drive unit 6. A front half portion (rear half portion) of the grip 16 and the front grip 18 each have a size enough to allow to be wrapped with one hand. A rear end portion of the main body housing 10 extends in an up-down direction so as to couple the outer wall of the rear end portion of the grip 16 to the outer wall of the rear end portion of the belt drive unit 6. In the rear end portion of the main body housing 10, a battery mounting portion 22, to which a battery pack 20 as a power source is mountable from upward in a state where a terminal portion (not illustrated) faces forward, is disposed. The main body housing 10 is formed by screwing a left main body housing 10L and the right main body housing 10R, which are each halved body.

The lateral housing 12 holds the power transmission unit. The side cover 14 covers the power transmission unit. The lateral housing 12 and the side cover 14 are screwed to a left side surface of the left main body housing 10L.

The main body housing 10 and the members held by the main body housing 10, such as the brushless motor 3, the power transmission unit, and the belt drive unit 6, as well as the lateral housing 12, and the side cover 14 and the members held by the side cover 14 constitute a main body 24 of the belt sander 1.

An upper end of the battery pack 20 mounted to the battery mounting portion 22 does not project upward compared with a top end surface of the main body 24.

The brushless motor 3 includes a pipe-shaped stator 30 and a rotor 32 passing through the stator 30 (an inner rotor type). A motor shaft 34 disposed in the axial center of the rotor 32 faces in a right-left direction.

A controller 36 that controls a rotating state and the like of the brushless motor 3 is held at the front of the lower portion of the brushless motor 3 inside the main body housing 10. The controller 36 is electrically coupled to the brushless motor 3 and the battery mounting portion 22.

The controller 36 includes a control circuit board (not illustrated) having a rectangular shape in top view. The control circuit board is electrically coupled to a sensor circuit board (not illustrated) that includes a sensor to detect a rotation position of the rotor 32. The control circuit board includes a control circuit, a driving circuit, and an auto-stop circuit. The control circuit includes a microcomputer that transmits a control signal based on rotation position information of the rotor 32 detected by the sensor circuit board. The driving circuit includes a FET that switches a current of the brushless motor 3 based on the control signal received from the control circuit. The auto-stop circuit cuts off an electric power supply to the brushless motor 3 to avoid an excessive discharge or an overcurrent corresponding to a detection result of the state of the battery pack 20.

A first switch 40 is held at the rear of the brushless motor 3 inside the main body housing 10. The first switch 40 is turned off when a column-shaped plunger 44 moves upward and a length of an exposed portion of the plunger 44 exceeds a predetermined threshold. The plunger 44 projects upward from an upper portion of a first switch main body 42 to be movable up and down. The first switch 40 is turned on when the plunger 44 moves downward and the length of the exposed portion of the plunger 44 becomes the predetermined threshold or less. The first switch 40 is electrically coupled to the controller 36.

Further, a second switch 50 is held in a rear portion of the grip 16 inside the main body housing 10. The second switch 50 is turned off when an actuator 54 moves rearward and an angle of the actuator 54 to a front surface of the second switch main body 52 becomes less than a predetermined threshold. The actuator 54 moves forward from a front lower portion of a second switch main body 52 while having a lower portion as a fulcrum to be movable back and forth. The second switch 50 is turned on when the actuator 54 moves forward and the angle of the actuator 54 to the front surface of the second switch main body 52 becomes the predetermined threshold or more. The second switch 50 is electrically coupled to the controller 36.

When both the first switch 40 and the second switch 50 are on, the controller 36 supplies the electric power of the battery pack 20 obtained via the battery mounting portion 22 to the brushless motor 3, thus allowing the operation of the brushless motor 3 (turning the brushless motor 3 on).

Meanwhile, when at least one of the first switch 40 and the second switch 50 is off, the controller 36 does not perform the power feeding to the brushless motor 3, thus not allowing the operation of the brushless motor 3 (turning the brushless motor 3 off).

Furthermore, the front grip 18 includes a rotation speed adjustment dial 56 whose right end portion is exposed to a right side surface.

The rotation speed adjustment dial 56 is electrically coupled to the controller 36. The controller 36 sets a rotation speed of the brushless motor 3 corresponding to a posture (rotation position) of the rotation speed adjustment dial 56.

The rotation speed adjustment dial 56 may be omitted.

The power transmission unit held onto the lateral housing 12 transmits a rotational force of the motor shaft 34 to a drive roller 60 of the belt drive unit 6.

Here, the power transmission unit includes an endless synchronous belt as a main component. The endless synchronous belt runs over a pulley integrated with a left end portion of the motor shaft 34 projecting to the inside of the lateral housing 12 and an intermediate shaft with a pulley coupled to the drive roller 60 via a gear (deceleration mechanism).

The belt drive unit 6 includes the cylindrical drive roller 60 disposed in a rear portion in a state of extending right and left, a cylindrical driven roller 62 disposed in a front portion in a state of being parallel to the drive roller 60, and a support frame 64 that supports the drive roller 60 and the driven roller 62 to be each rotatable around an axis.

The drive roller 60 rotates in a direction of an arrow C in FIG. 3 by the rotational force from the power transmission unit.

The sanding belt B is tensioned between the drive roller 60 and the driven roller 62.

On a lower surface of the support frame 64, a plate 66 that presses the sanding belt B to a material to be sanded side is disposed.

A rod-shaped front roller shaft 70 is internally passed through the driven roller 62 in a state of having a common center axis. The front roller shaft 70 is supported between supporting portions 72*a* of a shaft frame 72 that includes the supporting portions 72*a* in a U shape in top view in a front portion.

A rear portion of the shaft frame 72 forms an arm portion 72*b* projecting rearward from a rear right end portion of the supporting portion 72*a*. The arm portion 72*b* is supported to the support frame 64 to be movable back and forth. A rear end portion of the arm portion 72*b* forms an operating lever portion 72*c* exposed from a right surface of the support frame 64. The supporting portion 72*a* is turned to a state of being biased to an advance position or a state of being free forward and backward by the operation of the operating lever portion 72*c*.

When the supporting portion 72*a* becomes the forward/backward free state, the driven roller 62 becomes the forward/backward free state, thus allowing attaching and removing of the sanding belt B.

Meanwhile, when the supporting portion 72*a* is turned to the state of being biased to the advance position in the state where the sanding belt B is mounted, the driven roller 62 is biased to the advance position and the sanding belt B is tensioned.

On a left side surface of the main body housing 10, an adjustment knob 74 that regulates a lateral deviation in the right-left direction of the sanding belt B is disposed.

Below the drive roller 60, a dust collection port 80 extending in the right-left direction is open.

The main body housing 10 internally includes a guide passage 82. The guide passage 82 is communicated with the dust collection port 80, runs upward from the rear around the drive roller 60, further runs leftward, and reaches a starting end of a dust collection passage (not illustrated except the terminating end) of the lateral housing 12. The terminating end of the dust collection passage is a discharge pipe 84 formed to project rearward in an upper portion of a rear surface of the lateral housing 12.

In a right side surface of the main body housing 10, a wireless communication adapter insertion portion 86 is formed at the rear of the dust collection port 80 and the front of the battery mounting portion 22.

The wireless communication adapter insertion portion 86 is formed to be depressed to the left side in a box shape with respect to the other part of the right side surface of the main body housing 10, and a wireless communication adapter 88 is insertable. When being inserted, the wireless communication adapter 88 is electrically coupled to a controller for wireless communications (not illustrated) mounted in the controller 36.

The wireless communication adapter 88 wirelessly communicates with a dust collector (not illustrated) which is an incidental equipment. Through the wireless communication, a start operation and a stop operation of the dust collector are coordinated with a start operation and a stop operation of the belt sander 1.

A hose of the dust collector is coupled to the discharge pipe 84.

Preliminarily, an association (pairing) is performed to enable the wireless communication between the wireless communication adapter 88 and a dust collector side wireless communication adapter mounted to the dust collector. The pairing is performed by pressing a button of the dust collector side wireless communication adapter by the operator and operating a button of the wireless communication adapter 88 within a predetermined time period.

When the belt sander 1 starts to turn the brushless motor 3 on in a state where the pairing has completed, start information indicating the start is transmitted from the wireless communication adapter 88 to the dust collector, and the dust collector automatically starts based on the reception of the start information by the dust collector side wireless communication adapter. The wireless communication state is notified to the operator by a lighting state of a lamp disposed at the wireless communication adapter 88.

As illustrated in also FIG. 4A to FIG. 7, a seesaw-shaped switch lever 90 is disposed on the upper side of the plunger 44 of the first switch 40. The switch lever 90 is disposed on the lower surface of the grip 16, that is, a surface of the grip 16 on an opposite side of a surface of the operator side.

The switch lever 90 includes a cylindrically formed boss portion 90*a*, a trigger portion 90*b*, a pair of ribs 90*c*, and an acting portion 90*d*. The boss portion 90*a* extends in the right-left direction in the center. The trigger portion 90*b* is formed in a trigger shape on the rear side with respect to the boss portion 90*a*. The pair of ribs 90*c* are arranged right and left on the front side with respect to the boss portion 90*a* and formed to each project upward. The acting portion 90*d* is disposed on the front side with respect to the ribs 90*c* and contacts the upper end portion of the plunger 44.

A projection 92, which projects from the inner surface of the main body housing 10 in the right-left direction, is inserted into the boss portion 90*a*. The switch lever 90 is swingable about the projection 92.

The trigger portion 90*b* is exposable from an opening portion that is formed in the front lower portion of the grip 16 and extends in the front-rear direction. The switch lever 90 is swingable from the maximum projection posture (see P1 in FIG. 4A, FIG. 5(A) to a buried posture (see FIG. 4B, FIG. 6A, and FIG. 7). In the maximum projection posture, a hook portion 90*e* formed to project rearward in the rear upper portion of the trigger portion 90*b* hangs on an edge of the opening portion. In the buried posture, an upper surface of the trigger portion 90*b* contacts a front protrusion 94 and a rear protrusion 96 each projecting from the inner surface of the main body housing 10 in the right-left direction.

The acting portion 90*d* moves downward by the swing of the switch lever 90 based on a pull-in of the trigger portion 90*b*, and presses the plunger 44 to turn the first switch 40 on.

A torsion spring 108 as an elastic body (spring) is disposed outside the boss portion 90*a*. The torsion spring 108 includes a coil-shaped coil portion 108*a* that mainly provides elasticity and an arm portion 108*b* that extends rearward from the coil portion 108*a*. The coil portion 108*a* is arranged outside the boss portion 90*a* of the switch lever 90. The torsion spring 108 biases the switch lever 90 to the maximum projection posture side. The plunger 44 of the first switch 40 is biased upward, and the plunger 44 also biases the switch lever 90 to the maximum projection posture side. The biasing by the plunger 44 may be omitted.

A lock-on unit 100 is disposed on the upper side of the pair of ribs 90*c*.

The lock-on unit 100 includes a lock-on button 102 extending in the right-left direction and a compression spring 104 as an elastic body.

The lock-on button 102 as a lock operation unit includes a column-shaped lock-on button main body 102*a*, a projecting portion 102*b*, and a pair of right and left depressions 102*c*. The projecting portion 102*b* projects rearward from the lock-on button main body 102*a* and is provided with a closed-bottom hole that opens upward. The depressions 102*c* are each depressed upward from a lower end portion in the center of the lock-on button main body 102*a* in a closed-end slit shape.

A rear surface of a lower portion of the lock-on button main body 102*a* and a lower surface of the projecting portion 102*b* contact the front protrusion 94.

In the closed-bottom hole of the projecting portion 102*b*, the compression spring 104 is disposed to extend in the right-left direction. An upper rib 106 projecting downward from the inner surface of the main body housing 10 extends to reach the inside of the opening portion of the closed-bottom hole, thus blocking the removal of the compression spring 104.

The lock-on button 102 is supported to the main body housing 10 (grip 16 outer wall) to be movable in the right-left direction in a state of passing through lock-on button holes 109 each provided right and left of an outer wall of the front-end portion of the grip 16. The compression spring 104 biases the lock-on button 102 to be positioned in the center, that is, biases it to a position where the center in the right-left direction of the lock-on button 102 matches the center in the right-left direction of the grip 16.

Figures 5A, 5B:
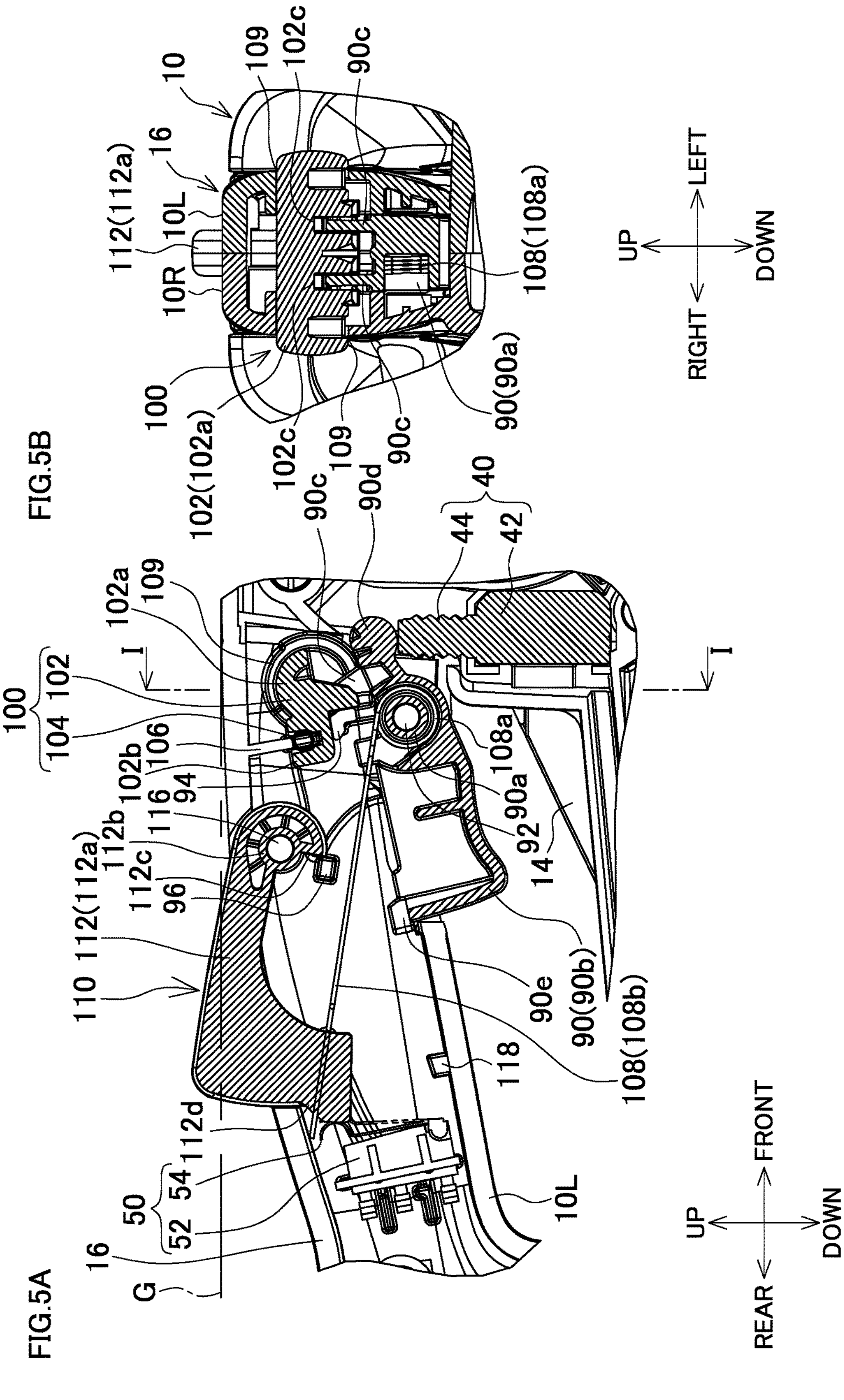
FIG. 5A is a center vertical cross-sectional view of the center portion of FIG. 3.
FIG. 5B is a cross-sectional view taken along I-I of FIG. 5A.

As illustrated in FIG. 5B, when the lock-on button 102 is positioned in the center, the ribs 90*c* of the switch lever 90 enter the depressions 102*c* of the lock-on button 102. Accordingly, upon the swing of the switch lever 90, the movement of the ribs 90*c* is not interfered with the lock-on button 102, thus allowing the pull-in of the switch lever 90.

Figures 6A, 6B:
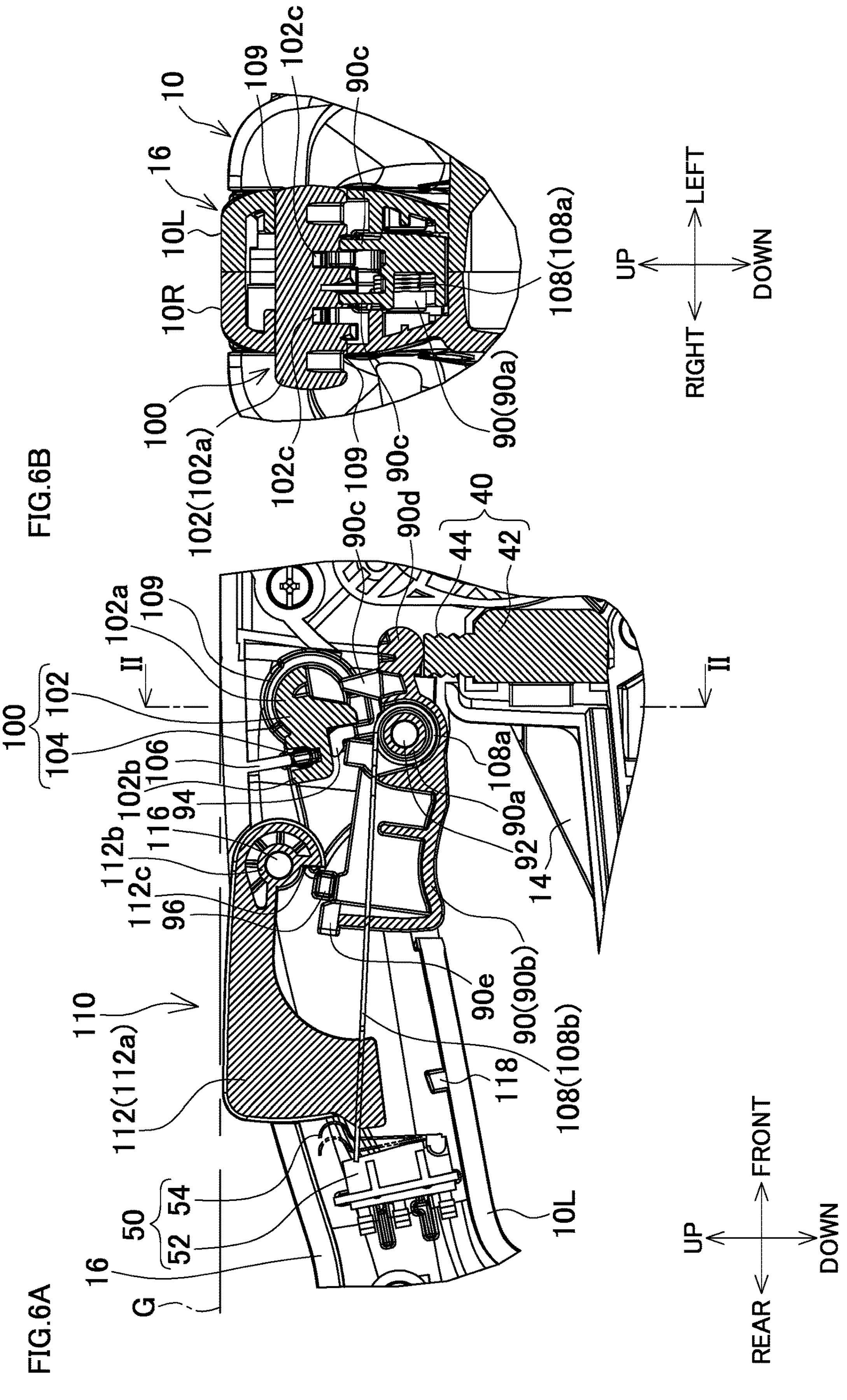

When the switch lever 90 is pulled by a predetermined pull-in amount or more, the ribs 90*c* get out of the depressions 102*c*. At this time, the first switch 40 has been turned on. In this state, when the lock-on button 102 is moved to the right side by the press-in operation, as illustrated in FIG. 6B, the ribs 90*c* are positioned in the front side of a portion where the depressions 102*c* are not provided in the lock-on button main body 102*a*. Accordingly, even when the operator stops the pull-in operation of the switch lever 90 and the switch lever 90 attempts to return to the maximum projection posture by the respective biasing forces of the plunger 44 and the torsion spring 108, the ribs 90*c* are arrested by the lock-on button main body 102*a* and the pull-in operation state of the switch lever 90 is kept. Therefore, the on-state of the first switch 40 is kept.

The performance when the lock-on button 102 is moved to the left side is similar to the performance in the case of being moved to the right side.

The keeping of the pull-in operation state of the switch lever 90 is released when the lock-on button 102 returns to the center to allow the ribs 90*c* to pass through the depressions 102*c*.

The switch lever 90 and the lock-on unit 100 (and the first switch 40) are components of a first operating unit configured to perform the on-operation of the brushless motor 3 (pull-in operation of the switch lever 90) and keep the on-operation (lock-on state). The compression spring 104 may be omitted.

A lock-off unit 110 is disposed at the rear of the lock-on button 102 in the center of the grip 16.

The lock-off unit 110 includes a lock-off lever 112 extending in the front-rear direction. The lock-off lever 112 is disposed at a position where an operation is allowed by a hand that grips the grip 16.

The lock-off lever 112 includes a lock-off lever main body 112*a*, a shaft hole portion 112*b*, a projection amount restricting portion 112*c*, and a torsion spring holding portion 112*d*. The lock-off lever main body 112*a* has an exposable upper portion and has a dorsal fin shape. The shaft hole portion 112*b* is disposed to extend in the right-left direction in a front-end portion of the lock-off lever main body 112*a*. The projection amount restricting portion 112*c* is disposed to extend in the up-down direction on a lower side of the shaft hole portion 112*b*. The torsion spring holding portion 112*d* is disposed in a rear lower portion of a rear portion of the lock-off lever main body 112*a*. The rear portion of the lock-off lever main body 112*a* projects downward compared with the front portion.

A projection 116, which projects in the right-left direction from the inner surface of the main body housing 10, is inserted into the shaft hole portion 112*b*. The lock-off lever 112 is swingable about the projection 116.

The lock-off lever main body 112*a* is exposable from an opening portion that is formed in the center of an upper surface as a surface on the operator side of the grip 16 and extends in the front-rear direction. The lock-off lever 112 is swingable from the maximum projection posture (see 01 in FIG. 4B, FIG. 5(A) to a buried posture (see FIG. 4B and FIG. 7) through a horizontal posture (see 02 in FIG. 4B, FIG. 6(A). In the maximum projection posture, the projection amount restricting portion 112*c* contacts the rear protrusion 96. In the horizontal posture, an upper surface of the lock-off lever main body 112*a* becomes horizontal. In the buried posture, a lower surface of the rear portion of the lock-off lever main body 112*a* contacts a regulating protrusion 118 projecting upward from the inner surface of the main body housing 10. In the lock-off lever 112 in the maximum projection posture, the torsion spring holding portion 112*d* projecting rearward hangs on a rear edge of the opening portion in the center of the outer wall of the grip 16.

The torsion spring holding portion 112*d* holds a rear end portion of the arm portion 108*b* of the torsion spring 108. The torsion spring 108 is interposed between the switch lever 90 and the lock-off lever 112, and biases the lock-off lever 112 in addition to the switch lever 90 to the maximum projection posture side.

The lock-off lever 112 in the maximum projection posture (FIG. 5A and FIG. 5B) moves the actuator 54 of the second switch 50 rearward by the torsion spring holding portion 112*d* that projects rearward, thus turning the second switch 50 off.

The lock-off lever 112 is pressed in from the maximum projection posture and separated from the actuator 54 by the press-in of a predetermined press-in amount prior to the horizontal posture, thereby moving the actuator 54 forward to turn the second switch 50 on. The actuator 54 is biased forward. Accordingly, the lock-off lever 112 in both of the horizontal posture (FIG. 6A and FIG. 6B) and the buried posture (FIG. 7) turn the second switch 50 on.

Figure 7:
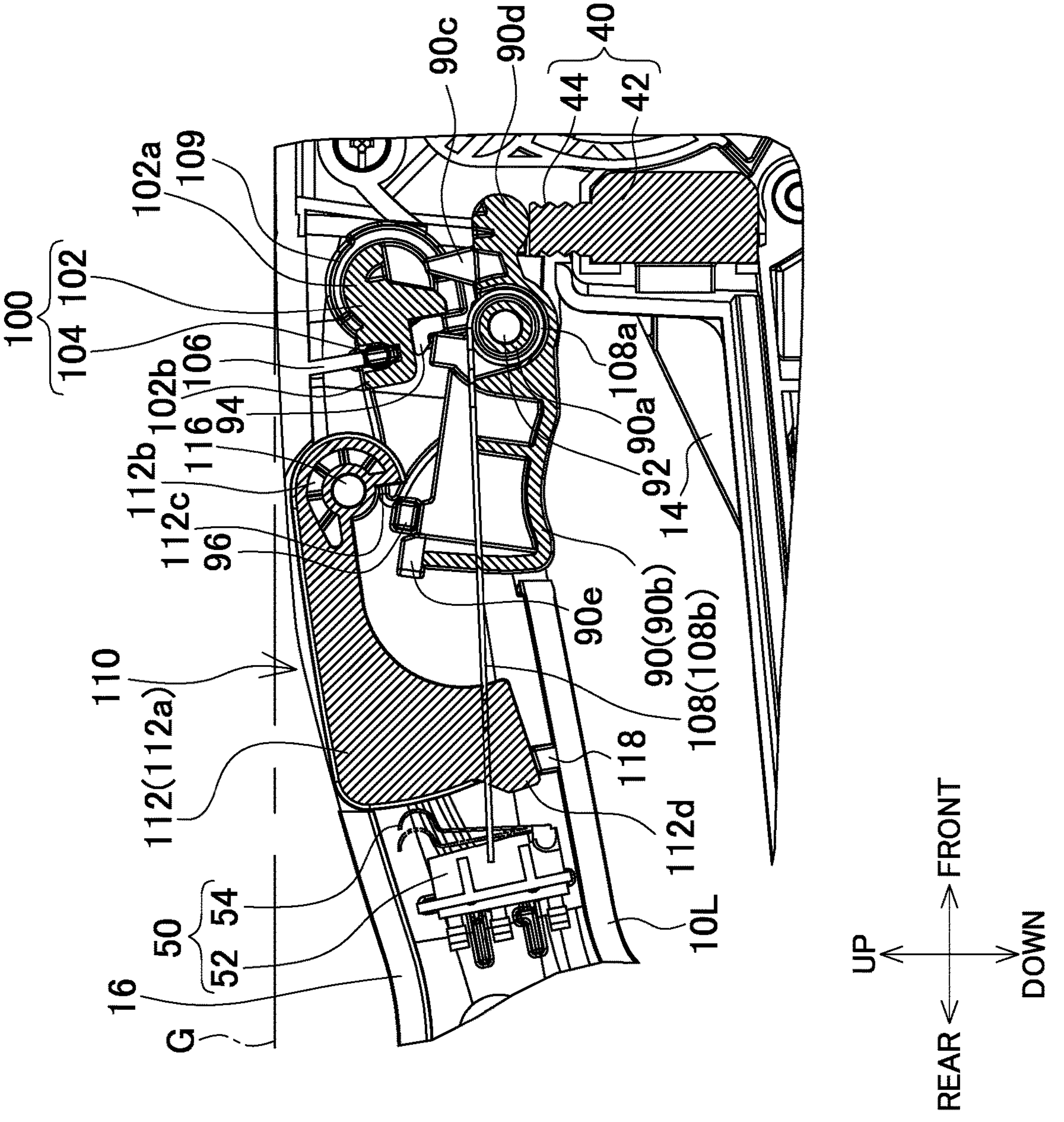

The lock-off lever 112 has a shape (shape in which the rear portion projects downward compared with the front portion) to avoid the switch lever 90 in the buried posture even in the buried posture (see FIG. 7).

The lock-off unit 110 (and the second switch 50) are components of a second operating unit configured to perform the on-operation of the brushless motor 3 (press-in operation of the lock-off lever 112).

The belt sander 1 operates, for example, as follows.

That is, the charged battery pack 20 is mounted to the battery mounting portion 22, and the operator pulls the switch lever 90 (on-operation of the first operating unit) and presses the lock-off lever 112 (on-operation of the second operating unit) while gripping the grip 16 in a state where the lock-on button 102 is positioned in the center. Accordingly, both the first switch 40 and the second switch 50 are turned on, thereby supplying the electric power of the battery pack 20 to the brushless motor 3 by the controller 36 to rotatably drive the motor shaft 34.

The rotation of the motor shaft 34 is transmitted to the belt drive unit 6 via the power transmission unit, and the sanding belt B is driven by the belt drive unit 6.

The rotated sanding belt B is pressed to the material to be sanded or moved by gripping the grip 16 (further, front grip 18) in the upper portion of the main body housing 10, thereby performing a work, such as a sanding, on the surface of the material to be sanded.

When at least one of the return of the switch lever 90 to a projection position by a predetermined projection amount or more by releasing the pull-in and the return of the lock-off lever 112 to a projection position by a predetermined projection amount or more by releasing the press is made, at least one of the first switch 40 and the second switch 50 is turned off. Then, the power feeding from the battery pack 20 to the brushless motor 3 is stopped by the controller 36, thereby stopping the rotation of the motor shaft 34 to stop the driving of the sanding belt B.

Thus, the lock-on unit 100 (first switch 40) and the lock-off unit 110 (second switch 50) serve as a double switch of the brushless motor 3.

When the operator presses the lock-on button 102 from the center to the left or the right in a state where the switch lever 90 is pulled (on-operation), the pull-in state of the switch lever 90 is held (lock-on state).

In the lock-on state of the switch lever 90, when a hand is held on the grip 16 to press the lock-off lever 112 (the on-operation of the second operating unit is performed), the sanding belt B is driven. Accordingly, the operator can perform the operation, such as the pressing and the moving of the belt sander 1, without continuing the pull-in operation of the switch lever 90.

When the operator releases the hand from the grip 16 to release the press-in of the lock-off lever 112 (off-operation), in more detail, when the operator loosens or stops the gripping of the grip 16 or shifts the hand from the center, the lock-off lever 112 returns to the projection position by the predetermined projection amount or more by the biasing force of the torsion spring 108. Then, the second switch 50 is turned off and the sanding belt B stops. Accordingly, the belt sander 1 that includes the lock-off unit 110 avoids a situation in which when the lock-on unit 100 is disposed while the lock-off unit 110 is not disposed, the operator releases the grip 16 in the lock-on state while the rotation of the sanding belt B is continued and the belt sander in the case unintentionally moves so as to separate from the operator.

Furthermore, the belt sander 1 is easily used on a flat surface in a reversed state where the sanding belt B faces the upper side (FIG. 6 A and FIG. 6B).

More specifically, the uppermost surface of the main body 24 is the center portion of the main body housing 10, and its extension surface is schematically illustrated by a one dot chain line Gin FIG. 5A to FIG. 7. In the reversed state, the center portion of the main body housing 10 contacts the flat surface, and a part of the flat surface matches the one dot chain line G in FIG. 6A. At this time, the lock-off lever 112 is pressed by the flat surface (on-operation of the second operating unit) to naturally take the horizontal posture, thus turning the second switch 50 on. Accordingly, in the reversed state, by simply operating the lock-on unit 100 at first, the operator can perform the work by the driving sanding belt B without the operation of the lock-on button 102 and the lock-off lever 112.

In the reversed state, since the sanding belt B is not placed on the material to be sanded or the like, the unintentional movement by the sanding belt B does not occur. Even when the belt sander 1 during the work in the reversed state is further reversed to return to an ordinary state, the lock-off lever 112 separates from the flat surface to return to the maximum projection posture side (off-operation of the second operating unit), and the driving of the sanding belt B is stopped via the second switch 50, the controller 36, and the brushless motor 3. Accordingly, even when the lock-on unit 100 continues to be operated, the lock-off unit 110 operates and the unintentional movement of the belt sander 1 is avoided.

Further, when both the first switch 40 and the second switch 50 are turned on, the wireless communication adapter 88 is controlled by the controller for wireless communications mounted in the controller 36, and the dust collector is activated through the wireless communication with the dust collector side wireless communication adapter.

The dust collection by the dust collector through suctioning air is performed as follows. That is, the dust generated around the appropriately rotating sanding belt B by the machining is suctioned by the dust collector coupled to the discharge pipe 84 passing through the dust collection port 80, the guide passage 82, and the dust collection passage.

Meanwhile, when any one of the first switch 40 and the second switch 50 is turned off, the operation of the dust collector is stopped via the wireless communication adapter 88 controlled by the controller for wireless communications.

The belt sander 1 described above includes the grip 16, the brushless motor 3, the switch lever 90 and the lock-on unit 100, and the lock-off unit 110. The grip 16 is configured to be gripped by the operator. The brushless motor 3 drives the sanding belt B. The switch lever 90 and the lock-on unit 100 are configured to perform the on-operation of the brushless motor 3, and configured to keep the on-operation. The lock-off unit 110 is configured to perform the on-operation of the brushless motor 3. The brushless motor 3 is rotated by the on-operations of both the switch lever 90 and the lock-off unit 110, and the lock-off unit 110 is disposed at the position where the operation is allowed by the hand that grips the grip 16.

Therefore, even when the on-operation of the switch lever 90 is kept by the lock-on unit 100, the operator can operate the brushless motor 3, eventually the sanding belt B, by the lock-off unit 110 operatable with the hand gripping the grip 16. Accordingly, the belt sander 1 that facilitates the operation of the lock-on unit 100 is provided.

The off-operation of the lock-off unit 110 is performed by releasing the hand from the grip 16. Accordingly, it is avoided that the situation in which the hand is released from the grip 16 in the lock-on state to cause the unintentional movement of the belt sander 1.

Further, the lock-off unit 110 is disposed on the upper surface of the grip 16 as the surface on the operator side. The on-operation of the lock-off unit 110 is a press operation, and the off-operation of the lock-off unit 110 is a release of the press operation. Accordingly, the operator can switch the driving of the brushless motor 3, eventually the sanding belt B, by pressing or releasing the lock-off lever 112, thus more facilitating the operation.

Furthermore, the switch lever 90 is disposed on the lower surface of the grip 16 as the surface on the opposite side of the surface on the operator side. The on-operation of the switch lever 90 is a pull operation. The on-operation of the switch lever 90 is kept by the lock-on button 102 configured to switch the keeping and the release of the pull operation state. The off-operation of the switch lever 90 is a release of the pull operation. Accordingly, the operator can switch the lock of the switch lever 90 and its release, and can switch the state of the switch lever 90 corresponding to the work content.

In addition, between the switch lever 90 and the lock-off lever 112, the torsion spring 108, which biases both the switch lever 90 and the lock-off lever 112 in the direction of the off-operation state, is interposed. Accordingly, the biasing forces, which are necessary for the return of the switch lever 90 and the lock-off lever 112 to the maximum projection posture sides, are provided by the common torsion spring 108.

The present invention is not limited to the embodiment and the modification example described above, but has further modification examples each described below as necessary.

The first operating unit may be a button switch, a toggle switch, or the like instead of the switch lever 90 and the lock-on unit 100 (lock-on mechanism that includes the lock-on button 102 lockable to the switch lever 90). In the case of the button switch, the keeping of the on-operation and the keeping of the off-operation may be switched every time when the button is pressed. The toggle switch may be configured to switch the keeping of the on-operation by tilting an operation lever to one side and the keeping of the off-operation by tilting the operation lever to the other side.

The second operating unit (lock-off unit 110) may be a lock-off mechanism, such as an arm configured to return the lock-on button 102 to the center, instead of the lock-off lever 112 configured to switch the second switch 50 as one in the double switch. The second operating unit may be, similarly to the first operating unit, a button switch, a toggle switch, or the like.

The lock-off unit 110 may be disposed to the front grip 18, or between the grip 16 and the front grip 18.

The switch lever 90 and the lock-off lever 112 may be biased to the maximum projection posture side by an elastic body (spring) other than the torsion spring. The switch lever 90 and the lock-off lever 112 may be biased to the maximum projection posture side by mutually different elastic bodies.

At least any of functions, arrangements, types, numbers, materials, installation or not of various members may be changed as necessary. For example, the synchronous belt and the pulley may be changed to a gear. In the belt sander 1 to which the battery pack 20 is mounted, the battery pack 20 may be rechargeable, a disposable battery pack may be used, or a power supply cord may be disposed to be coupled to a commercial power supply instead of the battery mounting portion 22. The main body housing 10 may be integrated instead of the right and left half bodies, the main body housing 10 may be further divided, or the main body housing 10 may be partially integrated with the lateral housing 12.

The invention claimed is:

1. A belt sander comprising:
a grip portion configured to be gripped by an operator;
an electric motor configured to drive a sanding belt;
a first operating unit configured to perform an on-operation of the electric motor and configured to keep the on-operation;
a second operating unit configured to perform an on-operation of the electric motor; and
a main body that includes the grip portion, wherein
the electric motor is rotated by the on-operations of both the first operating unit and the second operating unit,
the second operating unit is disposed at a position where an operation is allowed by a hand that grips the grip portion,
the surface on the operator side of the grip portion includes an uppermost surface of the main body, and
in a reversed state in which the uppermost surface contacts a flat surface, the second operating unit is pressed by the flat surface.

2. The belt sander according to claim 1, wherein
the second operating unit has a dorsal fin shape.

3. The belt sander according to claim 1, wherein
the first operating unit is disposed on a surface on an opposite side of the surface on the operator side of the grip portion,
the on-operation of the first operating unit is a pull operation,
a keeping of the on-operation of the first operating unit is performed by a lock operation unit configured to switch the keeping and a release of the pull operation state, and
an off-operation of the first operating unit is the release of the pull operation.

4. The belt sander according to claim 1, wherein
an off-operation of the second operating unit is performed by releasing the hand from the grip portion.

5. The belt sander according to claim 4, wherein
the second operating unit is disposed on a surface on the operator side of the grip portion,
the on-operation of the second operating unit is a press operation, and
the off-operation of the second operating unit is a release of the press operation.

6. The belt sander according to claim 1, wherein
a spring is interposed between the first operating unit and the second operating unit, and the spring biases both the first operating unit and the second operating unit in a direction of the off-operation state.

7. The belt sander according to claim 6, wherein
the spring is a torsion spring.

* * * * *